(12) United States Patent
Brunazzi et al.

(10) Patent No.: US 9,217,475 B2
(45) Date of Patent: Dec. 22, 2015

(54) UNCOUPLING DEVICE, PARTICULARLY FOR UNIVERSAL JOINT TRANSMISSIONS

(71) Applicant: COMER INDUSTRIES S.P.A., Milan (IT)

(72) Inventors: Achille Brunazzi, Frazione Santa Vittoria (IT); Massimo Tondelli, Campagnola Emilia (IT)

(73) Assignee: COMER INDUSTRIES S.P.A., Milan (IT)

( * ) Notice: Subject to any disclaimer, the term of this patent is extended or adjusted under 35 U.S.C. 154(b) by 8 days.

(21) Appl. No.: 14/445,302

(22) Filed: Jul. 29, 2014

(65) Prior Publication Data

US 2015/0034446 A1    Feb. 5, 2015

(30) Foreign Application Priority Data

Aug. 2, 2013   (IT) .............................. MO2013A0225

(51) Int. Cl.
| | |
|---|---|
| *F16D 7/04* | (2006.01) |
| *F16D 11/16* | (2006.01) |
| *F16D 43/202* | (2006.01) |
| *F16D 11/00* | (2006.01) |

(52) U.S. Cl.
CPC ............ *F16D 11/16* (2013.01); *F16D 43/2028* (2013.01); *F16D 2011/008* (2013.01)

(58) Field of Classification Search
CPC   F16D 11/16; F16D 43/2028; F16D 2011/008
USPC ................ 464/37–39; 192/56.1, 56.51–59.53
See application file for complete search history.

(56) References Cited

U.S. PATENT DOCUMENTS

| | | | | |
|---|---|---|---|---|
| 2,333,868 A | * | 11/1943 | Kylin .................... | B23G 1/46 464/38 X |
| 4,417,650 A | * | 11/1983 | Geisthoff ............ | F16D 43/2028 192/56.1 |
| 4,848,547 A | | 7/1989 | Kämpf | |
| 5,718,634 A | * | 2/1998 | Mikeska .............. | A01B 61/025 464/37 |
| 6,346,049 B1 | * | 2/2002 | Edi ......................... | F16D 7/04 464/38 |
| 7,993,205 B2 | * | 8/2011 | Kämpf .................... | F16D 7/048 464/37 |

FOREIGN PATENT DOCUMENTS

| | | |
|---|---|---|
| EP | 1072809 A1 | 1/2001 |
| EP | 1072810 A1 | 1/2001 |
| EP | 1260753 A2 | 11/2002 |
| EP | 2436944 A2 | 4/2012 |
| SE | 181 986    * | 12/1962 ...................... 464/38 |

OTHER PUBLICATIONS

Italian Search Report dated Apr. 14, 2014 for Italian Application No. ITMO2013A000225 filed Aug. 2, 2013, 2 pages.

* cited by examiner

*Primary Examiner* — Gregory Binda
(74) *Attorney, Agent, or Firm* — Brooks Kushman P.C.

(57) ABSTRACT

An uncoupling device, particularly for universal joint transmissions, is provided. The device includes a cylindrical casing, which is integral with a fork of a universal joint, having a plurality of radial slots provided on the inner circumferential surface of the casing. A pawl supporting cage is integral with a rotation shaft and includes a plurality of radial seats. The pawl is accommodated rotatably within the casing. A plurality of pawls is adapted to be accommodated in the radial seats of the cage. The pawls are adapted to pass from a coupling configuration to an uncoupling configuration. The device further includes an annular element which can move axially between a retracted position and an advanced position. The annular element includes a plurality of tongues.

8 Claims, 13 Drawing Sheets

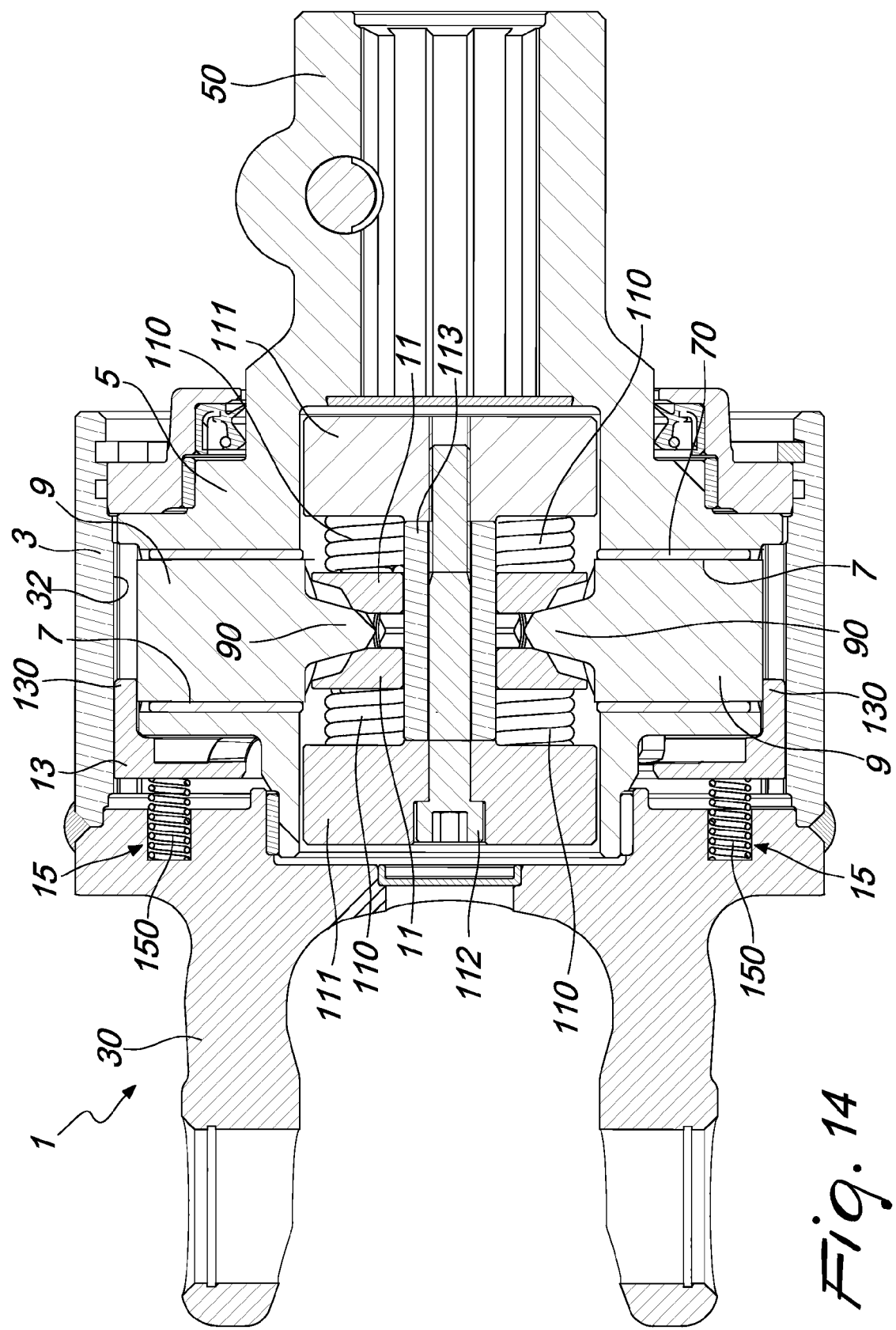

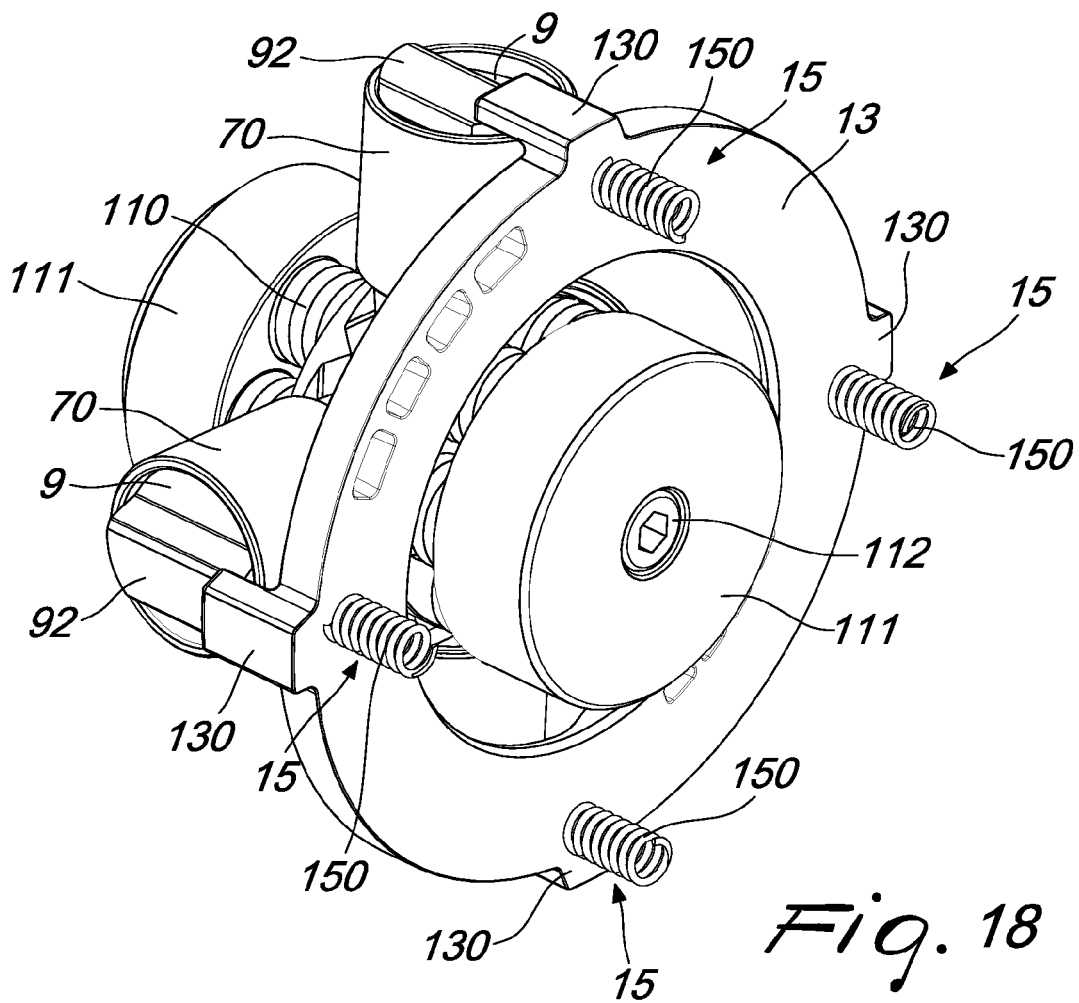
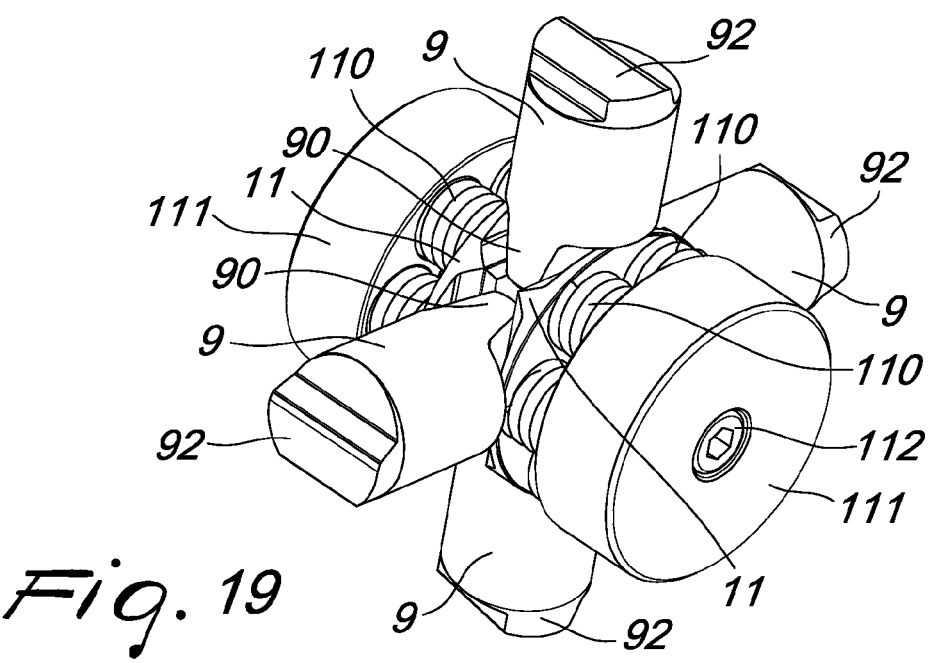

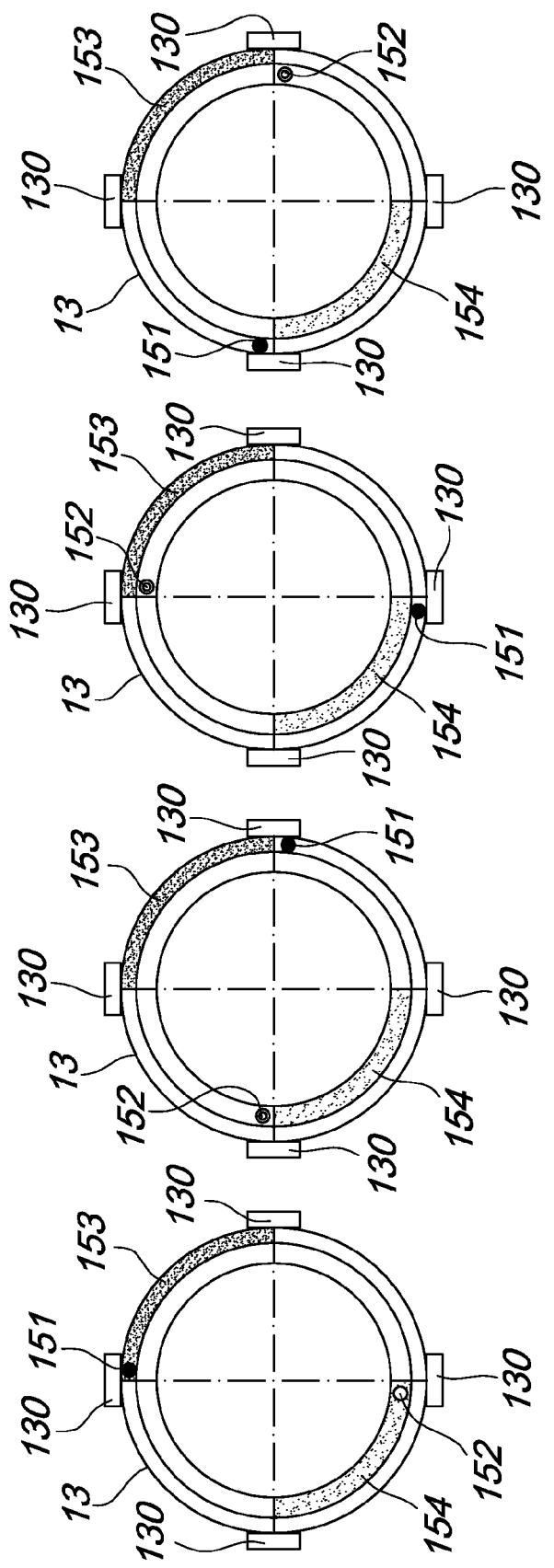

UNCOUPLING DEVICE, PARTICULARLY FOR UNIVERSAL JOINT TRANSMISSIONS

CROSS-REFERENCE TO RELATED APPLICATIONS

This application claims priority to Italian Patent Application No. MO2013A000225 filed on Aug. 2, 2013, the disclosure of which is hereby incorporated in its entirety by reference herein.

The present invention relates to an uncoupling device, particularly for universal joint transmissions.

BACKGROUND

Universal joint transmissions are made to transmit rotation and torque from a power take-off to a driven shaft.

In the presence of torques beyond design threshold, due for example to the intervention of foreign bodies, some elements of the universal joint transmission system or of the mechanism arranged downstream might undergo structural failure and also risk compromising the safety of the operator.

For this reason, several solutions are known which ensure protection from peak loads of the entire universal joint transmission system and of the mechanism arranged downstream.

In one of the solutions of the known type, the external rotatable element, connected to the source of driving torque, transmits the motion to a driven hub by means of a plurality of pawls. On the head of the pawls there is a shaped profile which engages adapted recesses or slots, provided on the inner surface of the external rotatable element. The head of each pawl is pressed against the recesses by means of a shaped foot of the pawl, which is kept in contact with wedges capable of pushing radially outwardly the pawls by way of elastic means. Torque transmission occurs by way of the tangential force that develops between the profile defined by the recesses in the external rotatable element and the head of the pawls. As the value of the resisting moment of the driven hub increases, a radial thrust on the pawl is generated which overcomes the contrast force generated by the elastic means, disengaging the head of the pawl from the corresponding recess. The head of the pawl therefore slides on the inner surface of the external rotatable element and the value of the transmitted torque decreases suddenly and is then restored when the pawls reengage the recesses of the external rotatable element.

These solutions of the known type are not devoid of drawbacks, including the fact that, during the relative rotation between the external rotatable element and the driven hub, the pawls are subjected to impacts that are repeated cyclically for the entire time during which the transmission remains uncoupled.

Another drawback of these solutions of the known type resides in that, because of the impacts, the useful life of the pawls and of all the components directly or indirectly subjected to the impacts is greatly reduced.

Another drawback of these solutions of the known type resides in that they have an early wear of the coupling and/or uncoupling system, with consequent alteration of the geometries and of the surfaces assigned to the exchange of actions and reactions that compromise their functionality.

SUMMARY

The aim of the present invention is to provide an uncoupling device, particularly for universal joint transmissions, that solves the technical problem cited above, obviates the drawbacks and overcomes the limitations of the background art, allowing to extend the useful life of the components subjected to coupling and uncoupling impacts.

Within this aim, an object of the present invention is to provide an uncoupling device that ensures to the universal joint transmission an optimum transition from the coupling configuration to the uncoupling configuration.

A further object of the invention is to provide an uncoupling device that is capable of giving the greatest assurances of reliability and safety in use.

Another object of the invention is to provide an uncoupling device that is easy to provide and economically competitive if compared with the background art.

This aim and these and other objects that will become better apparent hereinafter are achieved by an uncoupling device, particularly for universal joint transmissions, including: a cylindrical casing, which is integral with a fork of a universal joint, comprising a plurality of radial slots provided on the inner circumferential surface of the casing; a pawl supporting cage, which is integral with a rotation shaft, comprising a plurality of radial seats, and accommodated rotatably within the casing; a plurality of pawls adapted to be accommodated in the radial seats of the cage, the pawls being radially movable within the radial seats, each one comprising a foot that is interposed between two plates adapted to push radially outward the pawls and a head that is adapted to engage in the radial slots of the casing, the pawls being adapted to transition from a coupling configuration, in which the heads are coupled in the radial slots, in order to transmit torque and power between the casing that is integral with the fork of the universal joint and the cage that is integral with the rotation shaft, to an uncoupling configuration, in which the heads are released from the radial slots and slide circumferentially on the inner circumferential surface of the casing, in order to uncouple the transmission of torque and power between the casing and the cage, characterized in that it comprises an annular element, which can move axially between a retracted position and an advanced position, the annular element comprising a plurality of tongues that protrude axially and are aligned axially with the radial slots, and means for the axial movement of the annular element, in the coupling configuration, the annular element being in the retracted position, the radial slots being occupied by the heads of the pawls, in the uncoupling configuration, the axial movement means of the annular element actuating the transition of the annular element from the advanced position to the retracted position and vice versa, in the advanced position the tongues occupying the radial slots of the casing, left free by the pawls.

BRIEF DESCRIPTION OF THE DRAWINGS

Further characteristics and advantages will become better apparent from the description of a preferred but not exclusive embodiment of an uncoupling device, illustrated by way of non-limiting example with the aid of the accompanying drawings, wherein:

FIG. 14 is a sectional view of FIG. 13, taken along the line XIV-XIV, in the uncoupling configuration;

FIG. 18 is a perspective view of the uncoupling device, according to the invention, in the uncoupling configuration, from which the external casing and the pawl supporting cage have been removed;

FIG. 19 is a perspective view of the pawls and of the plates of the uncoupling device, according to the invention, in the uncoupling configuration;

FIGS. 20a-20d are schematic views of four different angular configurations in which the uncoupling device, according to the invention, can be in the transition from the coupling configuration to the uncoupling configuration.

DETAILED DESCRIPTION

Figure 1:
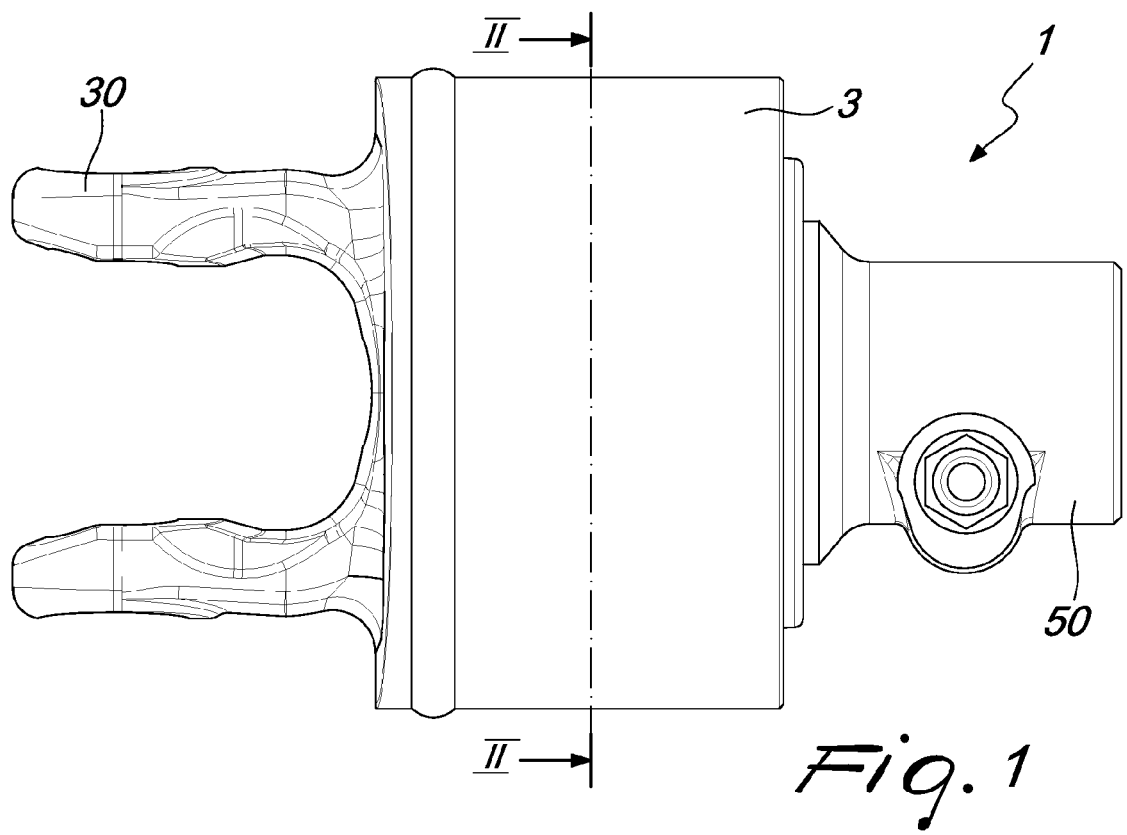
FIG. 1 is a front elevation view of an uncoupling device, according to the invention, applied to the end of a universal joint transmission.
Figure 2:
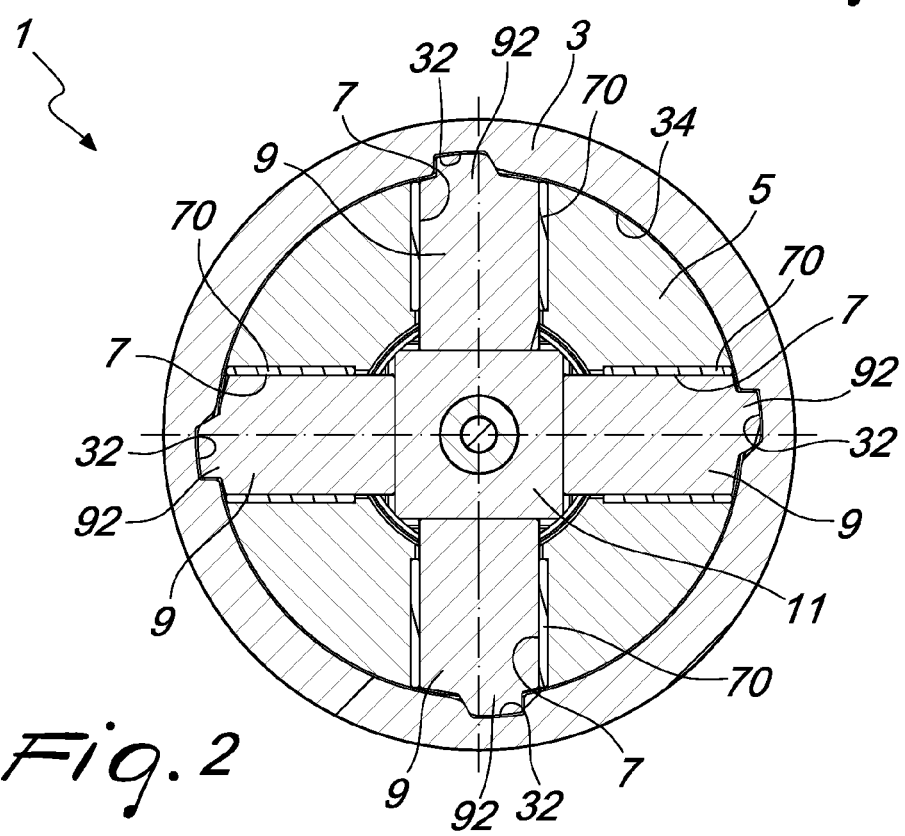
FIG. 2 is a sectional view of FIG. 1, taken along the line II-II.
Figure 3:
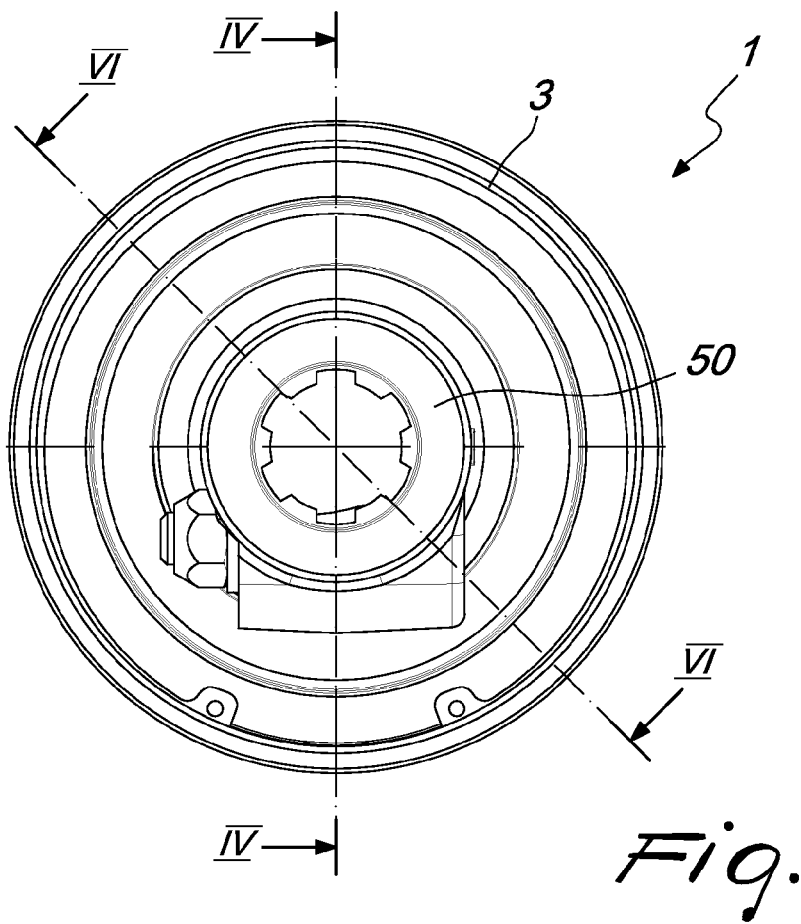
FIG. 3 is a side view, taken from the right, of FIG. 1.

With reference to the figures, the uncoupling device, particularly for universal joint transmissions, generally designated by the reference numeral 1, includes a cylindrical casing 3, which is integral with the fork 30 of a universal joint, which comprises a plurality of radial slots 32 provided on the inner circumferential surface 34 thereof; a pawl supporting cage 5, which is integral with a rotation shaft 50, comprising a plurality of radial seats 7, accommodated rotatably within the casing 3; a plurality of pawls 9, adapted to be accommodated in the radial seats 7 of the cage 5.

The pawls 9 are radially movable within the radial seats 7, and each one comprises a foot 90 that is interposed between two plates 11 adapted to push radially outward the pawls 9, and a head 92 adapted to engage in the radial slots 32 of the casing 3.

The pawls 9 are adapted to transition from a coupling configuration, in which the heads 92 are coupled in the radial slots 32, in order to transmit torque and power between the casing 3, which is integral with the fork 30 of the universal joint, and the cage 5, which is integral with the rotation shaft 50, to an uncoupling configuration, in which the heads 92 are released from the radial slots 32 and slide circumferentially on the inner circumferential surface 34 of the casing 3, in order to uncouple the transmission of torque and power between the casing 3 and the cage 5.

According to the invention, the uncoupling device 1 comprises an annular element 13, which can move axially between a refracted position and an advanced position. The annular element 13 comprises a plurality of tongues 130 that protrude axially and are aligned axially with the radial slots 32. Moreover, the uncoupling device 1 comprises means 15 for the axial movement of the annular element 13. According to the invention, in the coupling configuration, the annular element 13 is in the retracted position and the radial slots 32 are occupied by the heads 92 of the pawls 9.

In the uncoupling configuration, instead, the axial movement means 15 of the annular element 13 actuate the transition of the annular element 13 from the advanced position to the refracted position and vice versa. In particular, in the advanced position of the annular element 13, the tongues 130 occupy the radial slots 32 of the casing 3, left free by the pawls 9.

Advantageously, the axial movement means 15 comprise at least one spring 150 that is adapted to actuate the transition of the annular element 13 from the retracted position to the advanced position. Preferably, there are four springs 150 spaced angularly by 90° with respect to each other on the annular element 13.

Moreover, the axial movement means 15 comprise advantageously at least one axial pin 151, 152, which is associated with the cage 5, and at least one ramp 153, 154 provided in the annular element 13. The pin 151, 152 is adapted to abut against the ramp 153, 154 to actuate the transition of the annular element 13 from the advanced position to the retracted position.

Preferably, the axial movement means 15 comprise two axial pins 151 and 152 and two ramps 153 and 154. The first pin 151 is adapted to abut against the first ramp 153, while the second pin 152 is adapted to abut against the second ramp 154, in order to actuate the transition of the annular element 13 from the advanced position to the retracted position and to maintain the refracted position for a given angle of relative rotation between the cage 5 and the casing 3, that corresponds to the extension of the ramps 153 and 154.

Advantageously, moreover, the radial seats 7 comprise a bushing 70 adapted to accommodate slidingly the pawls 9.

The two plates 11 can be pushed advantageously against each other by way of elastic means 110, that are kept compressed between two disks 111, axially coupled to each other by a central bolt 112 and a spacer 113 or by another equivalent connection system, with respect to which the two plates 11 are free to slide axially.

The foot 90 of the pawls 9 can comprise advantageously two opposite first faces 95, which are inclined with respect to the longitudinal extension of the pawl 9 and adapted to abut, in the uncoupling configuration, against corresponding first abutment faces 114 of the two plates 11. The first abutment faces 114 are substantially parallel to the first opposite faces 95 of the foot 90.

Moreover, the foot 90 of the pawls 9 comprises two second opposite faces 97, which are inclined with respect to the longitudinal extension of the pawl 9 and are adapted to abut, in the coupling configuration, against corresponding second abutment faces 116 of the two plates 11. The second abutment faces 116 are substantially parallel to the second opposite faces 97 of the foot 90. The angle of inclination of the first opposite faces 95, and correspondently of the first abutment faces 114, with respect to the direction of longitudinal extension of the pawls 9 is smaller than the angle of inclination of the second opposite faces 97, and correspondingly of the second abutment faces 116.

The fact that the foot 90 of the pawls 9, and correspondingly the faces of the plates 11 that engage with it, have two different inclinations entails that the reaction components imparted by the plates 11 to the pawl 9 are different depending on whether one is in the coupling configuration or in the uncoupling configuration. The inclinations are in fact such as to generate a low radial reaction in the uncoupling configuration and a high radial reaction in the coupling configuration, i.e., if the relative speed between the casing 3 and the pawl supporting cage 5 is zero.

Operation of the uncoupling device, particularly for universal joint transmissions, is described hereinafter.

In the coupling configuration, the casing 3, which is welded to the fork 30, and the pawl supporting cage 5, which can be monolithic with the transmission shaft 50, rotate by the same extent, i.e., at the same speed. For example, motion enters from the fork 30 and is transmitted to the output shaft 50 through the coupling between the casing 3 and the cage 5, by means of the pawls 9. In fact, the pawls 9 act radially, supported by the plates 11, which apply a reaction to the foot 90 of the pawls 9, which is wedge-shaped, with a variable inclination of the faces 95 and 97. In particular, the two plates 11 are pushed by the elastic means 110 held compressed by the two disks 111, which are coupled by the central bolt 112 and by the spacer 113 on which the plates 11 are free to slide.

Figure 4:
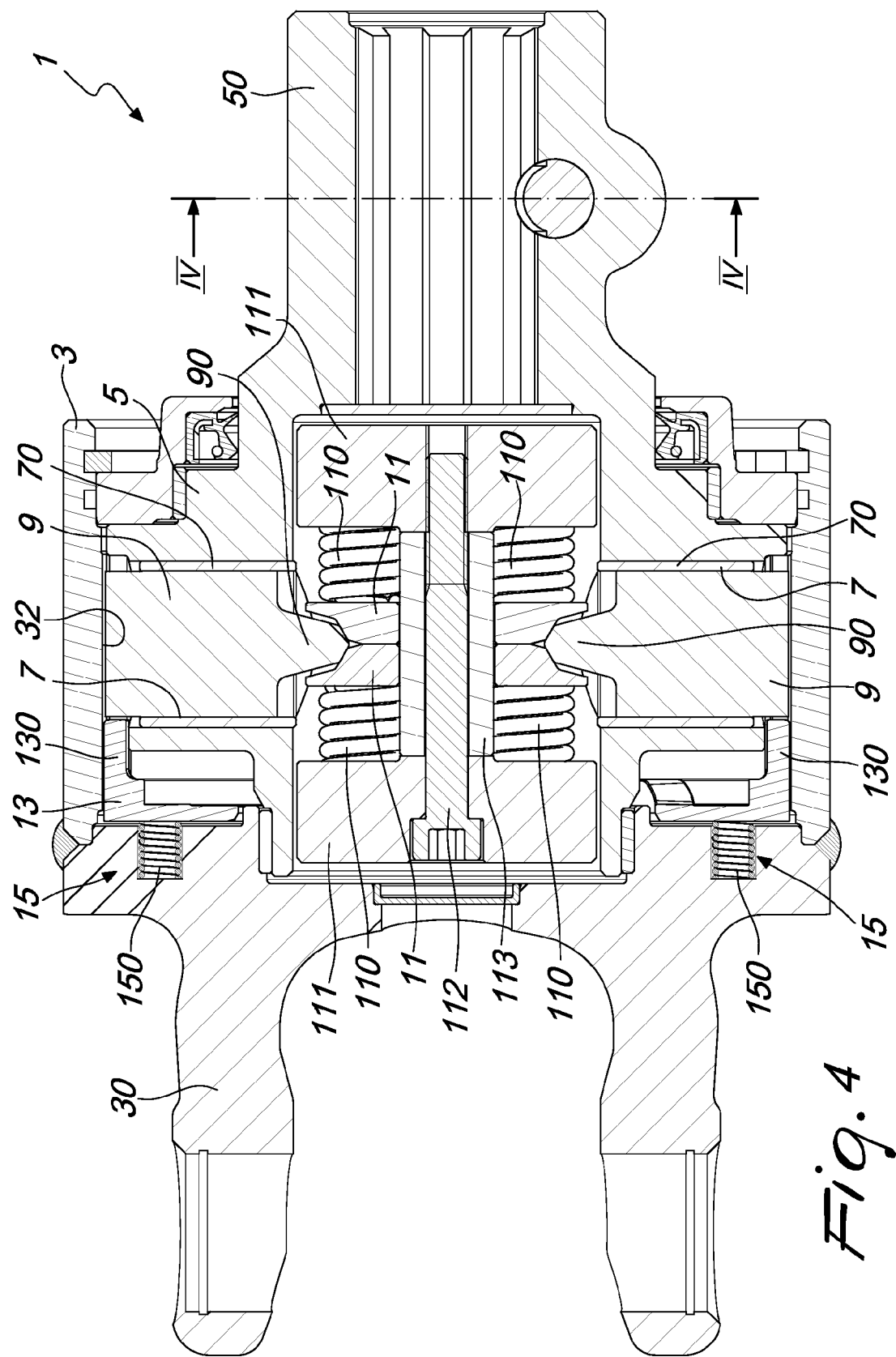
FIG. 4 is a sectional view of FIG. 3, taken along the line IV-IV.
Figure 6:
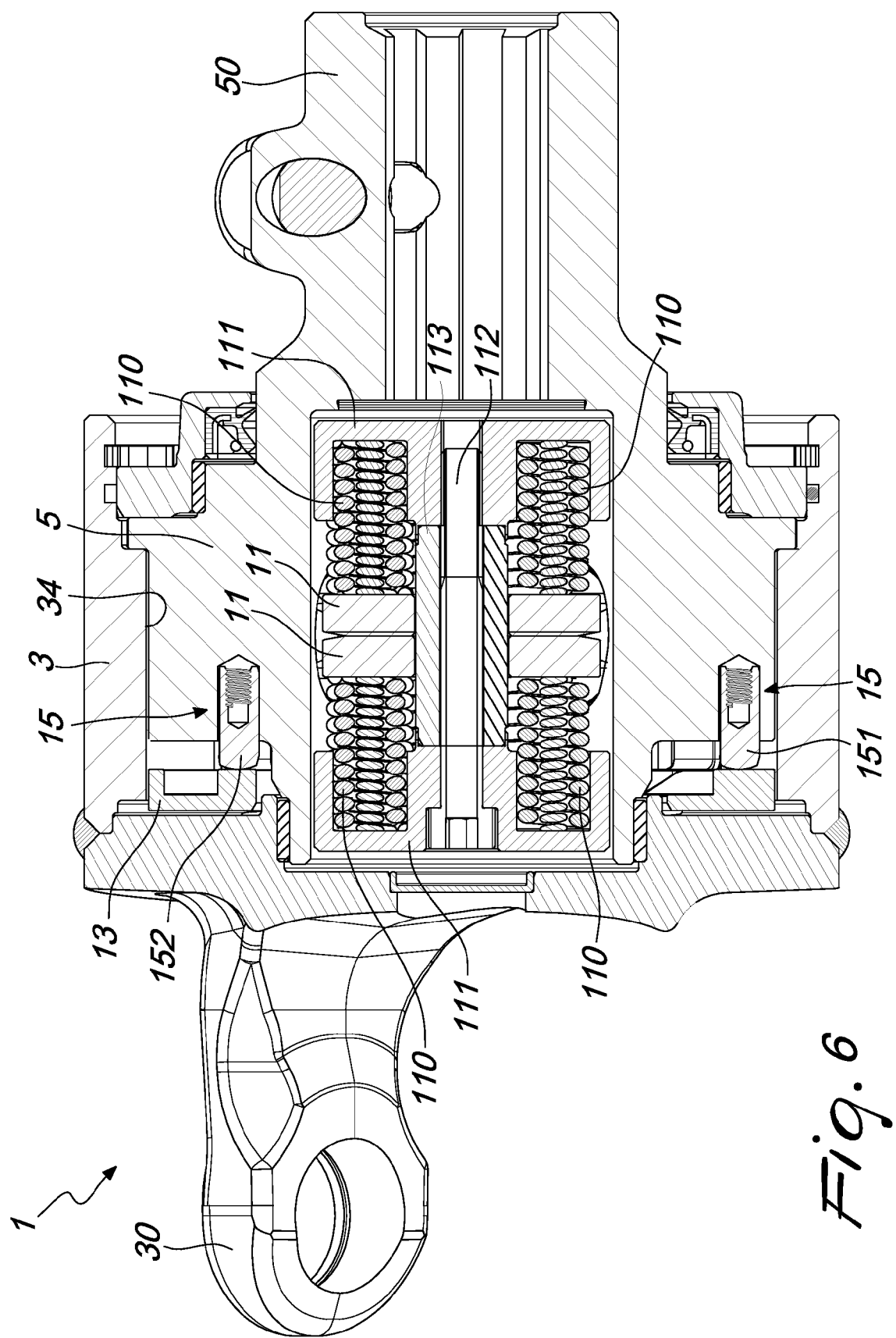
FIG. 6 is a sectional view of FIG. 3, taken along the line VI-VI.
Figure 7:
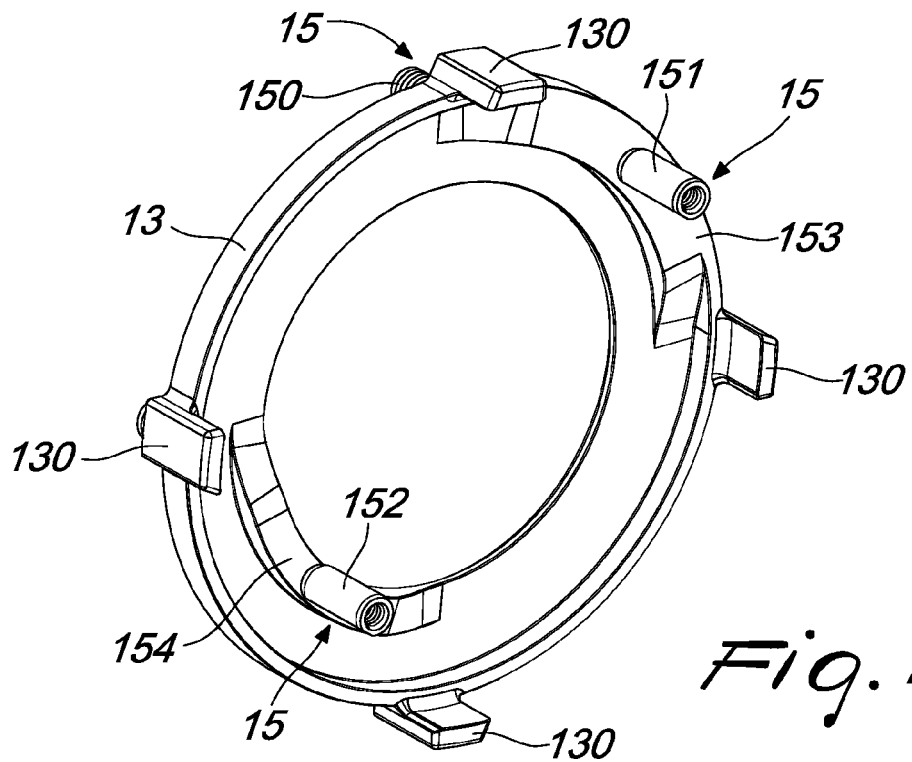
FIG. 7 is a perspective view of the annular element of the uncoupling device, according to the invention.
Figure 8:
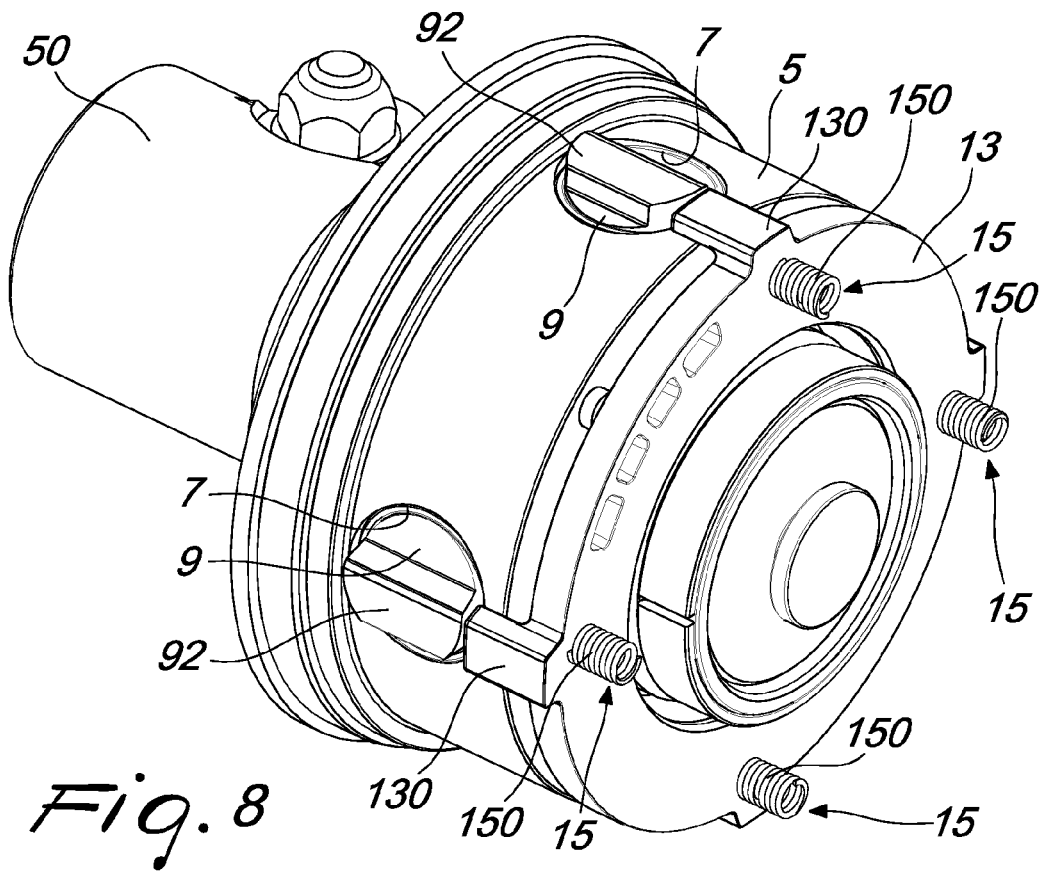
FIG. 8 is a perspective view of the uncoupling device, according to the invention, from which the external casing has been removed.
Figure 9:
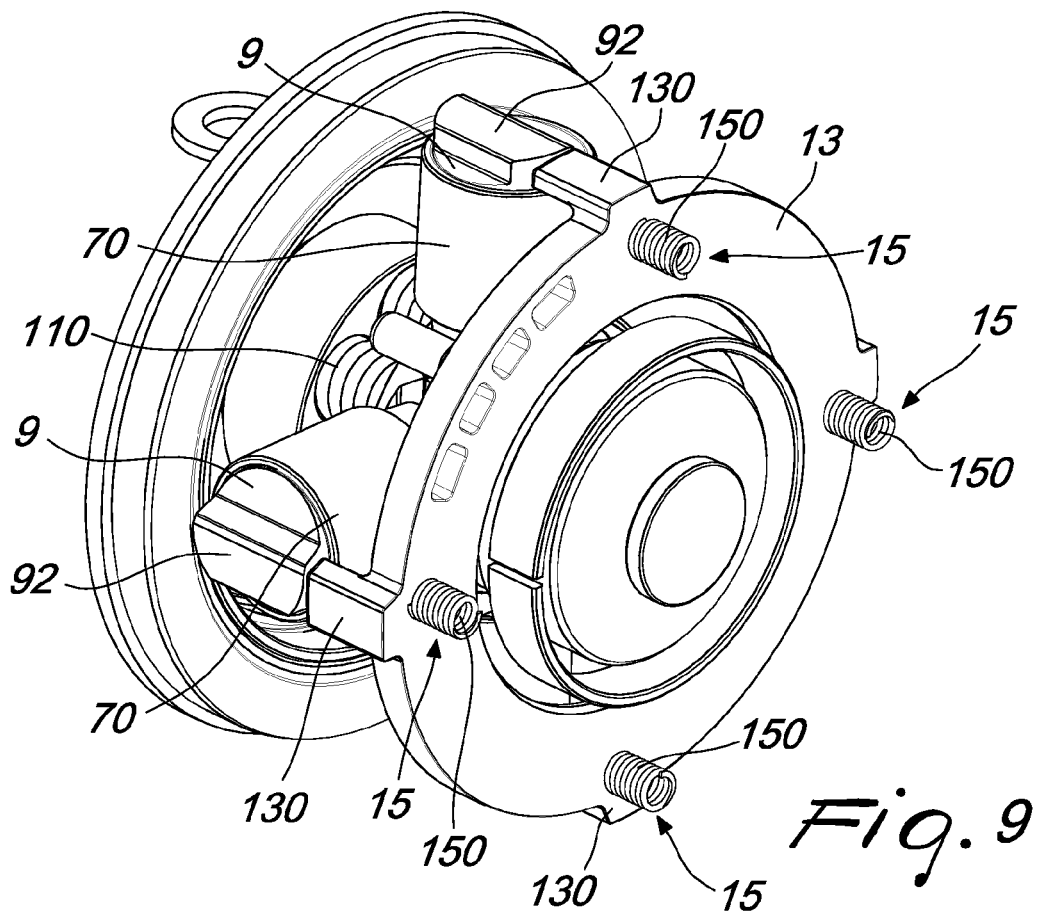
FIG. 9 is a perspective view of the uncoupling device, according to the invention, from which the external casing and the pawl supporting cage have been removed.
Figure 10:
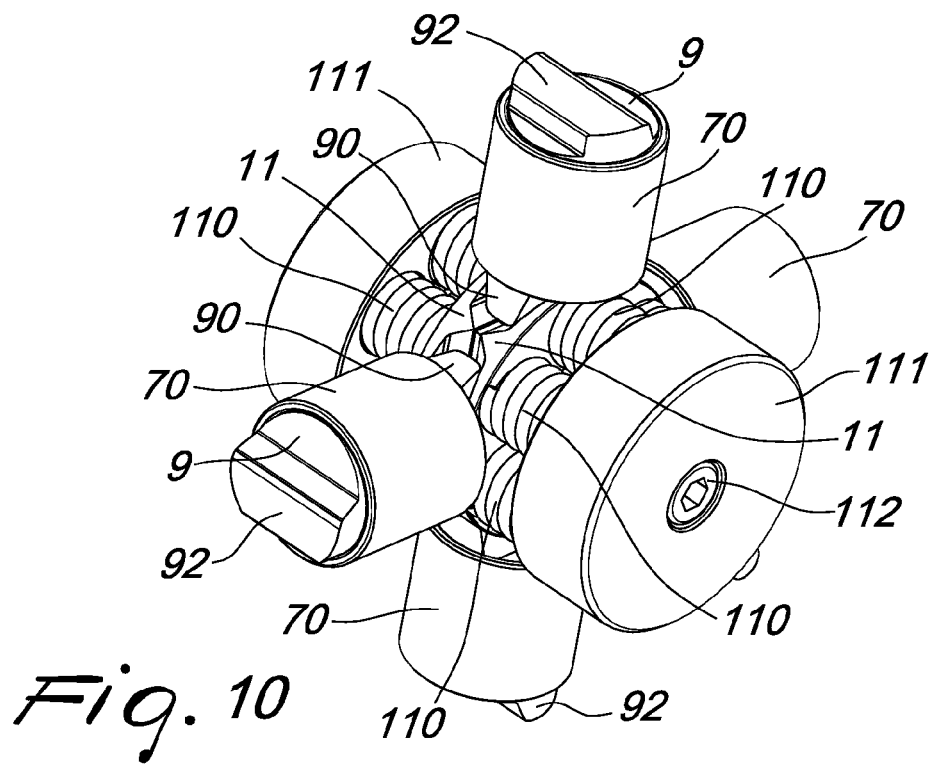
FIG. 10 is a perspective view of the pawls and of the plates of the uncoupling device, according to the invention.
Figure 11:
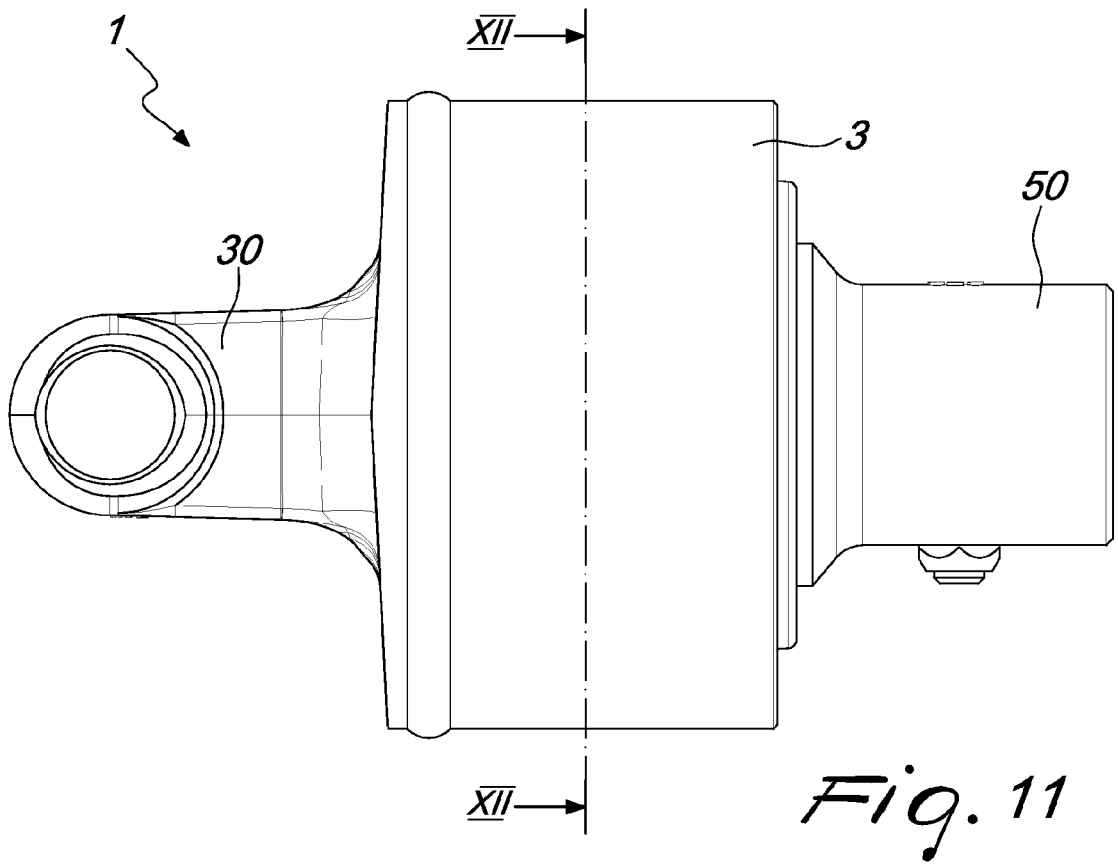
FIG. 11 is a top plan view of the uncoupling device, according to the invention, applied to an end of a universal joint transmission, shown in FIG. 1.
Figure 12:
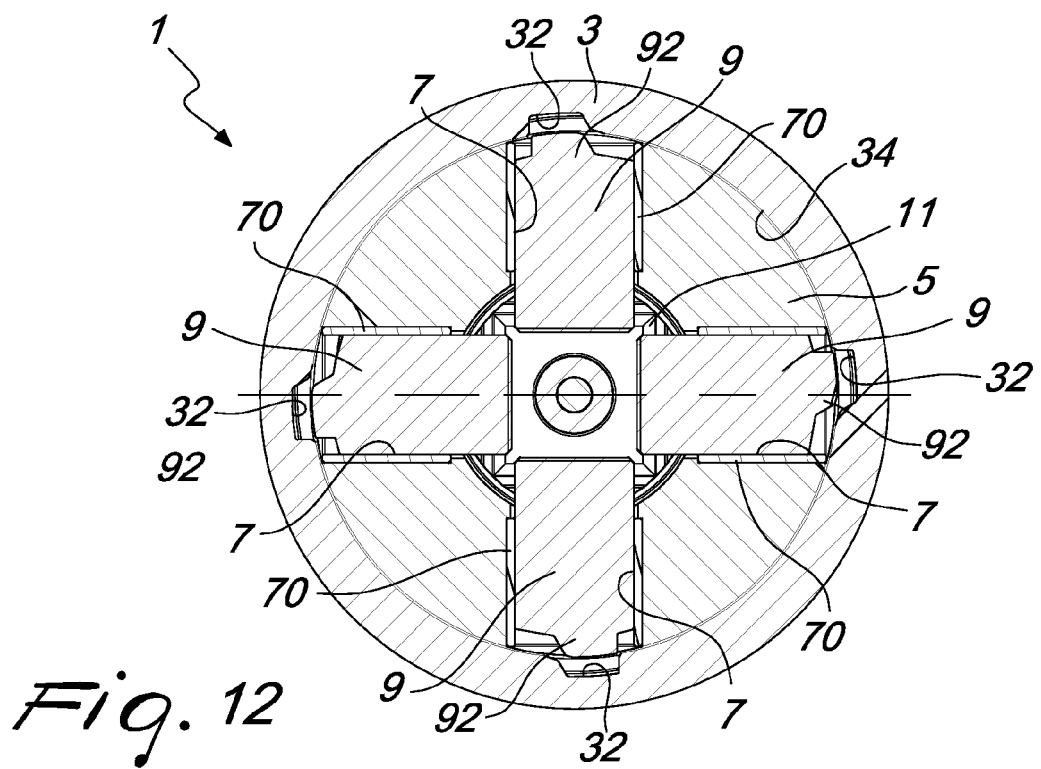
FIG. 12 is a sectional view of FIG. 11, taken along the line XII-XII, in the uncoupling configuration.
Figure 13:
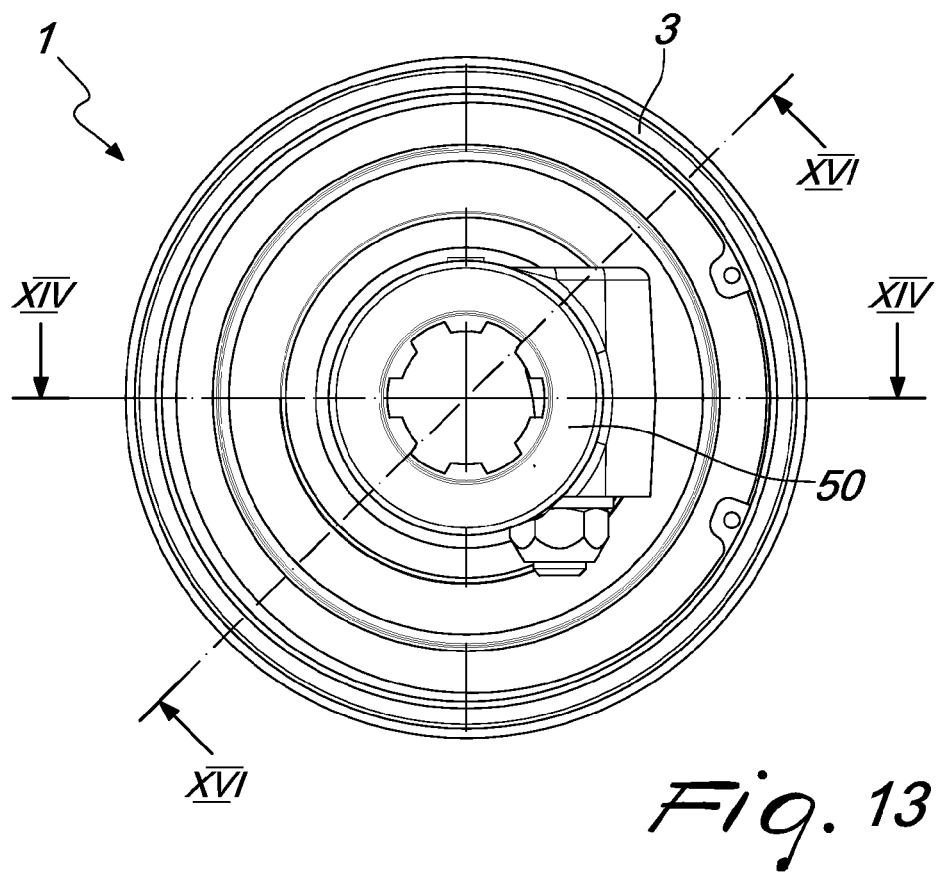
FIG. 13 is a side view, taken from the right, of FIG. 11.
Figure 15:
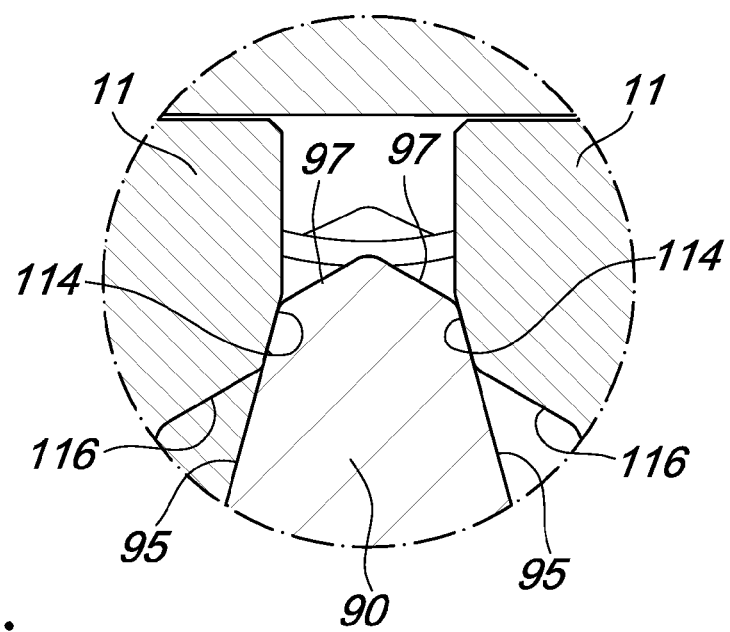
FIG. 15 is an enlarged-scale view of a detail of FIG. 14.
Figure 16:
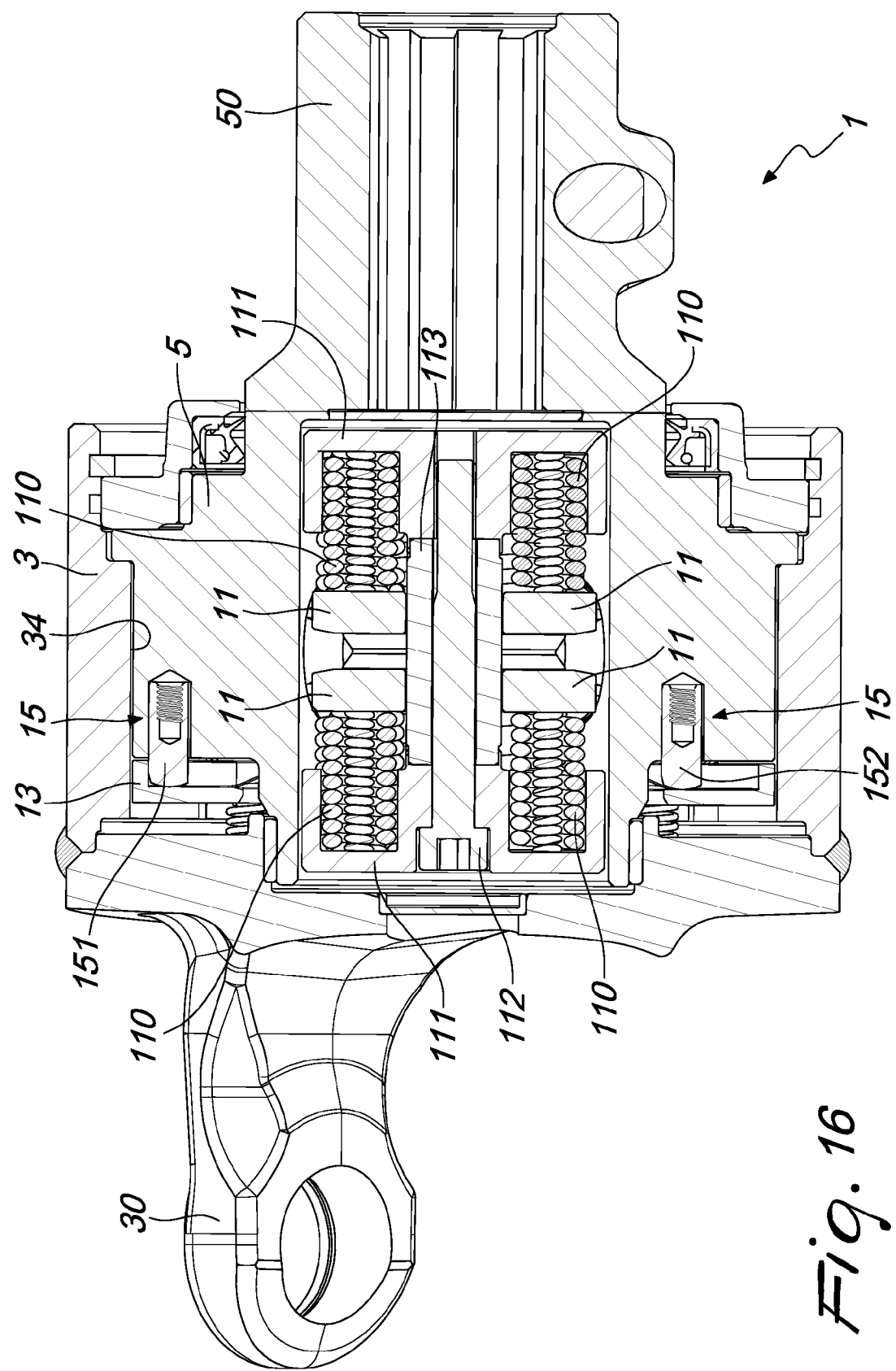
FIG. 16 is a sectional view of FIG. 13, taken along the line XVI-XVI, in the uncoupling configuration.
Figure 17:
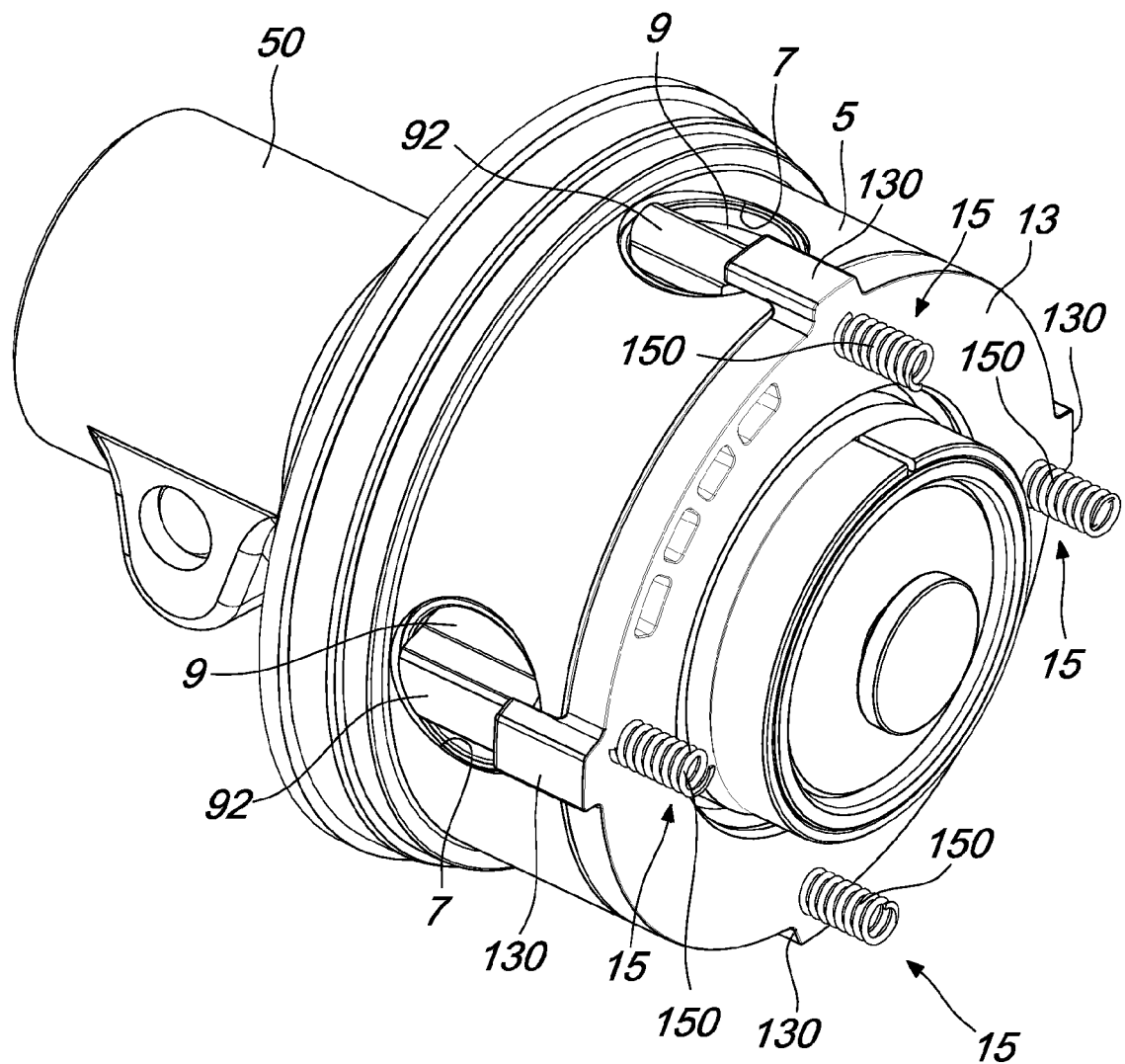
FIG. 17 is a perspective view of the uncoupling device, according to the invention, in the uncoupling configuration, from which the external casing has been removed.

With particular reference to FIG. 4, when the work vehicle, to which the motion arrives by means of the shaft 50, is subjected to a peak negative torque beyond the design threshold, the situation occurs in which the whole body, i.e., the cage 5, tends to slow down or seize, while the casing 3, moved by the power take-off of the tractor machine, continues to rotate. In this situation, the radial component of the force exchanged between the portion with inclined surface of the heads 92, and the portion with inclined surface of the radial slots 32, reaches such a value as to allow relative sliding between the surfaces, to the point that the heads 92 tend to exit from the corresponding radial slots 32. For the radial movement of the pawls 9 in their radial seat 7 to occur, the radial component of the force generated in the contact area between the pawls 9 (i.e., the head 92) and the casing 3 (i.e., the radial slots 32) must exceed the one generated by the pressure of the two plates 11 by means of the abutment faces 116 on the inclined faces 97 of the foot 90 of the pawls 9.

The foot 90 also is wedge-shaped, with a double inclination of the faces 95, 97 such as to allow a resolution of the reactions and particularly a modulation of the radial force that acts on the pawls 9 in the coupled configuration and in the uncoupled configuration.

Figure 5:
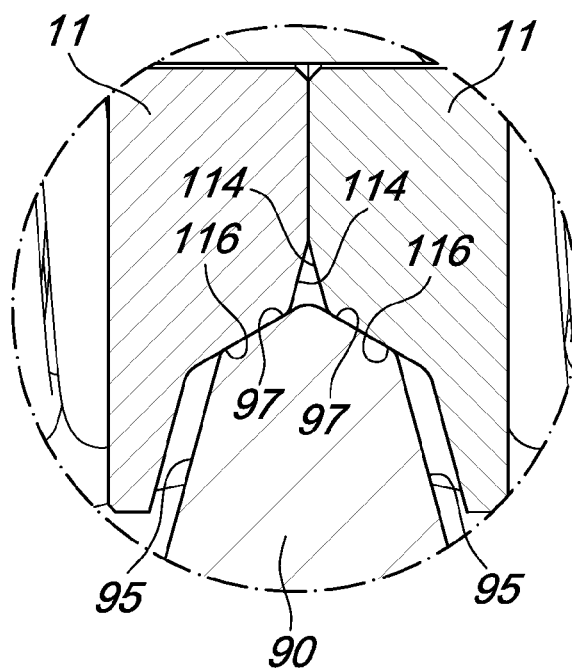
FIG. 5 is an enlarged-scale view of a detail of FIG. 4.

The enlarged-scale view of FIG. 5 shows a foot 90 of a pawl 9 interposed between two plates 11. The foot 90 has opposite faces that comprise portions with two different inclinations with respect to the longitudinal extension of the pawls 9, like the abutment faces of the plates 11. When the device 1 is in the coupled configuration, contact with the plates 11 occurs between the faces 97 of the foot 90 and the abutment faces 116 of the plates 11, which have such an inclination as to generate a high radial reaction and a low transverse component that moves away the plates 11. Such high radial reaction allows the pawls 9 to maintain their position and remain coupled. In the presence of the peak load, the force applied by the pawls 9 to the plates 11 overcomes the threshold level ensured by the pre-compression of the elastic means 110 and is such as to generate a transverse component that moves away the plates 11 and a radial component that causes the sliding of the pawls 9 in their radial seats 7. The sliding takes on such a value as to bring into contact the opposite faces 95 of the foot 90 and the abutment faces 114 of the plates 11, which have such an inclination as to allow a lower radial component and a large transverse component. When contact occurs between the faces, the pawls 9 are already uncoupled and the resolution of the reactions of the plates 11 allows to maintain this configuration. The pawls 9 can couple again only by decreasing the rotation rate of the power take-off and therefore of the casing 3. As long as the system is uncoupled, the radial reaction of the plates 11 on the pawls 9, although modest compared to that generated in the coupled configuration, pushes the pawls 9 with a relative rotary motion with respect to the casing 3, to recover the position of equilibrium upon passing over the radial slots 32.

This tendency to recover the position in the radial slots 32 may occur, in the specific case of the device shown, four times for each rotation, because the system is symmetric and has four pawls 9, and causes at each pass an impact between the head 92 of the pawl 9 and the walls of the radial slots 32.

The uncoupling device 1 comprises, inside the casing 3, the annular element 13, which limits the number of re-coupling configurations to only one for each rotation, increasing the useful life of the components of the device 1.

In particular, the annular element 13 is adapted to move axially between a retracted position and an advanced position, using as a guide both the inner circumferential surface 34 of the casing 3 and the radial slots 32 within which the protruding tongues 130 slide axially.

In the coupled configuration, with the pawls 9 in the respective radial slots 32, the annular element 13 is always retracted and the springs 150 are compressed. In the uncoupled configuration, by way of the action of the springs 150, the annular element 13 moves forward and the tongues 130 slide within the radial slots 32 left free by the pawls 9 that have retracted in the radial direction. The tongues 130, by occupying the radial slot 32 left free by the pawls 9, prevent them from tending to resume the position of equilibrium in the radial slots 32 at each pass.

However, the uncoupling device 1 allows only one re-coupling configuration for each rotation of the pawl supporting cage 5 with respect to the casing 3.

As already mentioned, in the uncoupling configuration, the annular element 13 can assume the advanced position or the retracted position. The retracted position is the one that leaves free the radial slots 32 of the casing 3 for the re-coupling of the pawls 9. The retracted or advanced position is controlled by the cam coupling between the two axial pins 151 and 152 integrated in the cage 5, rotating with respect to the casing 3, which act respectively on the two ramps 153 and 154, provided in the annular element 13. The use of at least two axial pins 151 and 152 allows to have a symmetrical thrust on the annular element 13, in order to avoid eccentric loads and seizing of the annular element 13.

In spite of the presence of two axial pins 151 and 152 and a double cam coupling by means of the ramps 153 and 154, the possibility to have a single re-coupling configuration for each rotation is ensured by a different radial distance of the two ramps 153 and 154 with respect to the rotation axis: only when the axial pin 151 pushes against the ramp 153 and simultaneously the axial pin 152 pushes against the ramp 154 is the annular element 13 in retracted position, freeing the radial slots 32, as shown schematically in FIG. 20a. In fact, only the first of the four angular configurations shown, in which the uncoupling device 1 can be, allows the transition of the annular element 13 to the retracted position. In the other three angular configurations shown in FIGS. 20b, 20c, 20d, the axial pins 151 and 152 do not engage the ramps 153 and 154 and the axial thrust of the annular element 13 in the retracted position does not occur.

The positions of the ramps 153 and 154 and of the axial pins 151 and 152 are such as to be in step with the passage of the pawls 9 on the radial slots 32. To allow re-coupling to occur easily, it is sufficient to reduce the rotation rate of the power take-off, i.e., of the input fork 30 and of the casing 3. In this condition the pawls 9 will be assuredly able to couple again automatically, without focused intervention on the device 1 by an operator.

In practice it has been found that the uncoupling device, according to the present invention, achieves the intended aim and objects, since it allows to prolong the useful life of the components subjected to coupling and uncoupling impacts.

Another advantage of the uncoupling device according to the invention is that is ensures a harmonious transition from the coupling configuration to the uncoupling configuration.

The uncoupling device thus conceived is susceptible of numerous modifications and variations, all of which are within the scope of the appended claims.

All the details may furthermore be replaced with other technically equivalent elements.

In practice, the materials used, so long as they are compatible with the specific use, as well as the contingent shapes and dimensions, may be any according to requirements.

What is claimed is:

1. An uncoupling device, particularly for universal joint transmissions, comprising:
 a cylindrical casing, which is integral with a fork of a universal joint, comprising a plurality of radial slots provided on the inner circumferential surface of the casing;
 a pawl supporting cage, which is integral with a rotation shaft, comprising a plurality of radial seats, and is accommodated rotatably within the casing;
 a plurality of pawls adapted to be accommodated in the radial seats of the cage, the pawls being radially movable within the radial seats, each one comprising a foot that is interposed between two plates adapted to push radially outward the pawls, and a head that is adapted to engage in the radial slots of the casing,
 the pawls being adapted to pass from a coupling configuration, in which the heads are coupled in the radial slots, in order to transmit torque and power between the casing that is integral with the fork of the universal joint and the cage that is integral with the rotation shaft,
 to an uncoupling configuration, in which the heads are released from the radial slots and slide circumferentially on the inner circumferential surface of the casing, in order to uncouple the transmission of torque and power between the casing and the cage, further comprising an annular element, which can move axially between a retracted position and an advanced position, the annular element comprising a plurality of tongues that protrude axially and are aligned axially with the radial slots, and means for the axial movement of the annular element, in the coupling configuration, the annular element being in the retracted position, the radial slots being occupied by the heads of the pawls, in the uncoupling configuration the axial movement means of the annular element actuating the transition of the annular element from the advanced position to the retracted position and vice versa, in the advanced position, the tongues occupying the radial slots of the casing, left free by the pawls.

2. The uncoupling device according to claim 1, wherein the axial movement means comprise at least one spring that is adapted to actuate the transition of the annular element from the refracted position to the advanced position.

3. The uncoupling device according to claim 1, wherein the axial movement means comprise at least one axial pin, which is associated with the cage, and at least one ramp provided in the annular element, the pin being adapted to abut against the ramp to actuate the transition of the annular element from the advanced position to the retracted position.

4. The uncoupling device according to claim 1, wherein the axial movement means comprise two axial pins and two ramps, a first pin of the two axial pins being adapted to abut against a first ramp of the two ramps, a second pin of the two axial pins being adapted to abut against a second ramp of the two ramps, in order to actuate the transition of the annular element from the advanced position to the retracted position and to maintain the retracted position for a given angle of relative rotation between the cage and the casing that corresponds to the extension of the ramps.

5. The uncoupling device according to claim 1, wherein the radial seats comprise a bushing adapted to accommodate slidingly the pawls.

6. The uncoupling device according to claim 1, wherein the two plates are pushed against each other by way of elastic means that are kept compressed between two axially fixed disks, with respect to which the two plates are free to slide axially.

7. The uncoupling device according to claim 1, wherein the foot of the pawls comprises two opposite first faces, which are inclined with respect to a longitudinal extension of the pawl and are adapted to abut, in the uncoupling configuration, against corresponding first abutment faces of the two plates, the first abutment faces being substantially parallel to the first opposite faces of the foot.

8. The uncoupling device according to claim 7, wherein the foot of the pawls comprises two second opposite faces, which are inclined with respect to the longitudinal extension of the pawl and are adapted to abut, in the coupling configuration, against corresponding second abutment faces of the two plates, the second abutment faces being substantially parallel to the second opposite faces of the foot, the angle of inclination of the first opposite faces, and of the first abutment faces, with respect to the direction of longitudinal extension of the pawls being smaller than the inclination angle of the second opposite faces, and of the second abutment faces.

\* \* \* \* \*